(12) United States Patent
Kawakami et al.

(10) Patent No.: US 6,268,317 B1
(45) Date of Patent: Jul. 31, 2001

(54) WORKING FLUID FOR REFRIGERATING CYCLE EQUIPMENT AND THE REFRIGERATING CYCLE EQUIPMENT USING THE SAME

(75) Inventors: Tetsuji Kawakami, Katano; Keizo Nakajima, Kawachinagano; Kiyoshi Sawai, Otsu; Takayoshi Ueno, Hirakata, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/179,209

(22) Filed: Oct. 27, 1998

(30) Foreign Application Priority Data

Oct. 30, 1997 (JP) .................................................. 9-298273
Apr. 24, 1998 (JP) ................................................. 10-115024

(51) Int. Cl.[7] .............................................. C10M 105/32
(52) U.S. Cl. ....................... 508/305; 508/462; 508/517; 252/67; 252/68
(58) Field of Search .................... 508/305, 307, 508/462, 517; 252/67, 68; 558/265

(56) References Cited

U.S. PATENT DOCUMENTS

| | | | | |
|---|---|---|---|---|
| 2,379,249 | * | 6/1945 | Muskat ................................. | 558/265 |
| 2,384,123 | * | 9/1945 | Muskat et al. ......................... | 558/265 |
| 2,789,968 | * | 4/1957 | Reynolds et al. ..................... | 558/265 |
| 2,844,451 | * | 7/1958 | Alpert et al. ......................... | 558/266 |
| 2,866,757 | * | 12/1958 | Newman et al. ..................... | 208/304 |
| 3,261,782 | * | 7/1966 | Anderson .............................. | 508/304 |
| 3,280,078 | * | 10/1966 | Hostettler et al. .................... | 508/304 |
| 3,497,478 | * | 2/1970 | Field ..................................... | 558/265 |
| 3,758,514 | * | 9/1973 | Heiba .................................... | 508/304 |
| 4,217,298 | * | 8/1980 | Shikata et al. ........................ | 558/265 |
| 4,273,726 | * | 6/1981 | Altuglu ................................. | 558/265 |
| 4,293,503 | * | 10/1981 | Young ................................... | 558/265 |
| 5,114,605 | * | 5/1992 | Mizui et al. ........................... | 508/304 |
| 5,238,590 | * | 8/1993 | Mizui et al. ........................... | 508/304 |
| 5,262,076 | * | 11/1993 | Ishida et al. ........................... | 508/304 |
| 5,294,356 | * | 3/1994 | Tanaka et al. ......................... | 508/304 |
| 5,326,486 | * | 7/1994 | Mizui et al. ........................... | 508/304 |
| 5,370,809 | * | 12/1994 | Ishida et al. ........................... | 508/304 |
| 5,384,056 | * | 1/1995 | Tanaka et al. ......................... | 508/304 |

(List continued on next page.)

FOREIGN PATENT DOCUMENTS

| | | |
|---|---|---|
| 100 65 65 | * 4/1987 | (DE) . |
| 0 421 298 A2 | 4/1991 | (EP) . |
| 0 534 735 A1 | 3/1993 | (EP) . |
| 0 655 494 A1 | 5/1995 | (EP) . |
| 0 779 289 A1 | 6/1997 | (EP) . |
| WO 90/05174 | 5/1990 | (WO) . |

OTHER PUBLICATIONS

The Chemical Process Industries, "Refrigerant" Shrene, 123:117816;1995:676096 Caplus; "Lubrication for hydrocarbon refrigerants", Abstract, Spauschus 2nd Ed., p. 76–78, 1956.*
Copy of European Search Report dated Jul. 6, 1999 in European Application No. 98308813.9 (4 pages).

*Primary Examiner*—Margaret Medley
(74) *Attorney, Agent, or Firm*—Akin, Gump, Strauss, Hauer & Feld, L.L.P.

(57) ABSTRACT

A working fluid which demonstrates a preferable performance even with a small filling amount of the refrigerant of hydrocarbons containing no halogen atom such as ethane, propane, butane, iso-butane and the like into the refrigerating cycle equipment is disclosed. There is also disclosed a refrigerating cycle equipment excellent in the safety against the worst case of the refrigerant leakage, brought by the use of the above-mentioned working fluid. The working fluid comprises the refrigerant of hydrocarbons containing 2 to 4 carbon atoms and no halogen atom, and a lubricating oil for a refrigerator containing, as its main component, an ester compound which is incompatible with the above-mentioned refrigerant.

15 Claims, 1 Drawing Sheet

U.S. PATENT DOCUMENTS

| | | | | |
|---|---|---|---|---|
| 5,387,354 | * | 2/1995 | Mizui et al. | 508/304 |
| 5,391,311 | * | 2/1995 | Tanaka et al. | 252/68 |
| 5,476,602 | * | 12/1995 | Tanaka et al. | 252/68 |
| 5,565,129 | * | 10/1996 | Tanaka et al. | 508/216 |
| 5,569,408 | * | 10/1996 | Peppmoller et al. | 508/462 |
| 5,688,432 | * | 11/1997 | Pearson | 252/67 |

* cited by examiner

Fig. 1

WORKING FLUID FOR REFRIGERATING CYCLE EQUIPMENT AND THE REFRIGERATING CYCLE EQUIPMENT USING THE SAME

BACKGROUND OF THE INVENTION

The present invention relates to a working fluid comprising a refrigerant and a refrigeration lubricant which is used in a refrigerating cycle equipment of refrigerant compression-type.

In the refrigerating cycle equipments of refrigerant compression-type such as air conditioners, electric refrigerators (freezers), refrigerating or freezing ware houses and refrigerating show cases, hydrocarbons containing a fluorine atom have conventionally been employed as refrigerant.

In particular, hydrocarbons containing a chlorine atom in addition to the fluorine atom have long been employed as the refrigerant having excellent performance such as nonflammability or the like. These chlorofluorocarbons (CFC) and hydrochlorofluorocarbons (HCFC) contain a chlorine atom. It has now been clarified that these refrigerants destruct the ozone layer when they are released to the open air and reached the stratosphere, and the use of them has recently been limited or inhibited globally.

At present, hydrofluorocarbons (HFC) containing no chlorine atom have begun to be employed in stead of these refrigerants. Although the HFC has no potential for destructing the ozone layer, it demonstrates a high green-house effect because its life in the air is long. Thus, the HFC is not necessarily an excellent refrigerant in the viewpoint of preventing the global warming which is a problematic concern in recent years.

In stead of the above-mentioned hydrocarbons containing a halogen atom, hydrocarbons containing no halogen atom, which are inflammable but have an ozone layer depletion potential (ODP) of zero and a very small global warming potential (GWP) as compared to the hydrocarbons containing a halogen atom, are now employed as the refrigerant. The refrigerating cycle equipment employing this refrigerant is practically used as the refrigerator and feasibility of the refrigerant for developing large-size equipment is now under investigation.

With respect to the refrigeration lubricant as a component of the working fluid which is employed together with the refrigerant, mineral oils and alkylbenzene compounds which were conventionally employed as the refrigeration lubricant could not be used with the recent trend for shifting the refrigerant to the ozone layer nondestructive HFC such as R-134a (1,1,1,2-tetrafluoroethane), because they have no compatibility with such refrigerant. In a refrigerating cycle of refrigerant compression-type, a portion of the refrigeration lubricant is discharged from the compressor together with the refrigerant. Therefore, the refrigeration lubricant must not be separated from the refrigerant to stay in the refrigerating cycle (other than the compressor) in order to secure an amount of oil required for lubricating the mechanism of circulating the refrigerant through the refrigerating cycle with a low temperature part and returning the same to the compressor.

For these reasons, it has been believed that the refrigeration lubricant should have compatibility with the refrigerant. In the refrigerating cycle equipment which employs the HFC as the refrigerant, glycol ether oils or polyol ester oils are mainly used as the refrigeration lubricant. In a limited number of equipment, alkylbenzene oils which are incompatible with the HFC refrigerant are used (JP-A-5-157379).

In addition, various carbonate oils are proposed as the refrigeration lubricant for the HFC refrigerant (JP-A-3-149295, JP-A-3-247695, and others).

Further, hydrocarbons containing no halogen atom such as ethane, propane, butane, iso-butane and the like are used as the refrigerant. As well as the less polar mineral oils and alkylbenezene oils which have been used with the (hydro) fluorocarbons containing a chlorine atom, the much polar glycol ether oils and polyol ester oils, which have been used with the hydrofluorocarbons containing no chlorine atom, have a high compatibility with the hydrocarbon refrigerant containing no halogen atom. Therefore, it has been believed that there is no problem in selecting the refrigeration lubricant.

In case of employing the above-mentioned refrigeration lubricant, however, its compatibility with the refrigerant is excessive and the amount of the refrigerant to be dissolved in the refrigeration lubricant becomes excessively large. Namely, there is a problem that a refrigerating cycle equipment could not sufficiently demonstrate its performance if a large amount of the refrigerant is charged in the equipment. Further, another problem arises in case wherein the refrigerant leaks from the refrigerating cycle equipment because the hydrocarbons containing no halogen atom such as ethane, propane, butane, iso-butane and the like used as the refrigerant are remarkably inflammable. In other words, it can be presumed that there is a problem in safety because the larger the amount of the refrigerant in the refrigerating cycle equipment is, the larger becomes the amount of leakage in the worst case.

In addition, in a refrigerating cycle equipment employing a HFC refrigerant together with an alkylbenzene oil which has no compatibility with the HFC, the specific gravity of the HFC refrigerant is larger than that of the refrigeration lubricant. Therefore, there is a further problem that an oiling mechanism for a sliding part of a refrigerant compressor, an oil returning mechanism for the refrigeration lubricant component circulating through the refrigerating cycle, or a driving control mechanism becomes complicated.

It is therefore the primary object of the present invention to provide a working fluid which demonstrates preferable performance even with the small amount of the refrigerant containing no halogen atom such as ethane, propane, butane, iso-butane or the like in the refrigerating cycle equipment.

It is another object of the present invention to provide a refrigerating cycle equipment excellent in its safety by the use of the above-mentioned working fluid even in the worst case of refrigerant leakage.

BRIEF SUMMARY OF THE INVENTION

The present invention provides a working fluid for a refrigerating cycle equipment of refrigerant compression-type containing the refrigerant and a refrigeration lubricant for a refrigerator, wherein;

the above-mentioned refrigerant comprises a hydrocarbon having 2 to 4 carbon atoms and no halogen atom, and the above-mentioned refrigeration lubricant for the refrigerator comprises, as a main component, an ester compound which is incompatible with the above-mentioned refrigerant.

In the above-mentioned ester compound, the number of the carbon atoms constituting ester bond preferably occupies not less than 10 atom % of the whole carbon atoms constituting the above-mentioned ester compound.

Further, it is preferable that the above-mentioned ester compound is a chain (linear) carbonate compound, a cyclic carbonate compound or a cyclic ester compound.

The above-mentioned chain carbonate compound is preferably represented by the formula (1):

(1)

wherein $R^1$ is a methyl group, an ethyl group, an n-propyl group, an iso-propyl group, an n-butyl group, a sec-butyl group or a t-butyl group, each of $R^2$, $R^3$ and $R^4$ is independently a hydrocarbon group having 2 to 5 carbon atoms or a hydrocarbon group having 2 to 10 carbon atoms and an ether bond such as alkyloxyalkylene group, poly (oxyalkylene) group and the like, and each of l, m and n is independently an integer of not less than 0 (wherein, l, m and n are not 0 at the same time).

It is preferable that said cyclic carbonate compound is represented by the formula (2):

(2)

wherein X is a methylene group or an oxygen atom, each of $R^5$ and $R^6$ is a hydrogen atom or a methyl group, $R^7$ does not exist or is —$CH_2O$—, —$CH_2O(CH_2CH_2O)_p$—($CH_2CHCH_3O)_q$, or —$CH_2O\{COO$—$(CH_2CH_2O)_p\}_r$—$\{COO$—$(CH_2CHCH_3O)_q\}_s$— (wherein p and q are not 0 at the same time and each is an integer of 0 to 3 independently, r and s are not 0 at the same time and each is an Integer of 0 to 2 independently), β is a hydrogen atom or an alcohol residue of hydric value β, α is an integer of 0 to 2, and β is an integer of 0 to 4.

Further, the above-mentioned cyclic carbonate compound is preferably represented by the formula (3):

(3)

wherein $R^8$ is an ethylene bond, a 2-methylethylene bond, an ethyleneoxyethylene bond, or a 2-methylethyleneoxy-2-methylethylene bond.

In addition, the above-mentioned cyclic carbonate compound is preferably represented by the formula (4):

(4)

wherein $R^9$ is a hydrogen atom, a methyl group or a hydroxymethyl group, and $R^{10}$ is an oxygen atom or an oxymethylene group.

Further, the above-mentioned cyclic carbonate compound is preferably represented by the formula (5):

(5)

The above-mentioned cyclic carbonate compound is preferably represented by the general formula (6):

(6)

wherein $R^{11}$ is a hydrogen atom or a methyl group, $R^{12}$ is a methyl group or a ethyl group and v is an integer of 1 to 3.

Further, the above-mentioned cyclic carbonate compound represented by the formula (2) is preferably obtained by the steps of:

(a) allowing a cyclic ether compound represented by the formula (7):

(7)

wherein each of $R^5$ and $R^6$ is independently a hydrogen atom or a methyl group, $R^7$ does not exist or is —$CH_2O$—, —$CH_2O(CH_2CH_2O)_p$—$(CH_2CHCH_3O)_q$ or —$CH_2O\{COO—(CH_2CH_2O)_p\}_r$—$\{COO—(CH_2CHCH_3O)_q\}_s$— (wherein, p and q are not 0 at the same time and each is an integer of 0 to 3 independently, r and s are not 0 at the same time and each is an integer of 0 to 2 independently), A is a hydrogen atom or an alcohol residue of hydric value β, α is an integer of 0 to 2, and β is an integer of 0 to 4, to react with carbon dioxide in the presence of a tetra-alkylammonium halide catalyst in an amount of not more than 0.1 mol %,

(b) removing said catalyst from the reaction product by washing with an acidic aqueous solution and then with water, and (c) removing residual cyclic ether compound from the washed and dried reaction product by evaporation.

In the above-mentioned working fluid for a refrigerating cycle equipment of refrigerant compression-type in accordance with the present invention, a saturation solubility of the above-mentioned refrigerant in the refrigeration lubricant is preferably 0.1 to 5 wt % at 70° C. under a vapor pressure of the refrigerant of 1.77 MPa.

In addition, a specific dielectric constant of the cyclic carbonate compound represented by the aforementioned formula (2) is preferably 40 to 100 at 25° C.

Further, the cyclic carbonate compound represented by the formula (2) is preferably at least one selected from the group consisting of propylene carbonate, butylene carbonate and γ-butyrolactone and further at least one of polyalkylene glycol compounds represented by the formula (8):

(8)

D is a hydrogen atom or wherein z is a hydrogen atom or a monohydric alcohol residue, and t and u are an integer of 0 to 20 (wherein, t+u≧2) and l is an integer of 1 to 4 is preferably contained.

In the above-mentioned working fluid for a refrigerating cycle equipment of refrigerant compression-type in accordance with the present invention, the content of the carbonate compound in the refrigerator oil is preferably 50 to 100%.

Further, it is preferable that the dynamic viscosity of the refrigerator oil is $5\times10^{-6}$ to $4\times10^{-5}$ m²/s at 40° C.

In addition, the present invention also provides a refrigerating cycle equipment which uses the above-mentioned working fluid.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

In the followings, the working fluid and refrigerating cycle equipment in accordance with the present invention are explained in concrete.

The working fluid of the present invention is a working fluid for a refrigerating cycle equipment of refrigerant compression-type containing the refrigerant and a refrigeration lubricant, wherein; the above-mentioned refrigerant comprises a hydrocarbon having 2 to 4 carbon atoms and no halogen atom, and the above-mentioned lubricant for the refrigerator comprises, as a main component, an ester compound which is incompatible with the above-mentioned refrigerant.

In first, a description will be made on the refrigerant. The hydrocarbon refrigerant having 2 to 4 carbon atoms and no halogen atom of the present invention may be any hydrocarbon as far as it is non-polar in the viewpoint of incompatibility with the refrigeration lubricant as described below. As the refrigerant, there are, for example, saturated hydrocarbons such as ethane, propane, n-butane, iso-butane and the like, unsaturated hydrocarbons such as ethylene, propene and the like. Although each of these refrigerants may be used alone, they can also be used in an admixture of two or more if the effect of the present invention is not decreased.

Among them, it is preferable to use a refrigerant comprising propane, n-butane or iso-butane, as its main component, from the viewpoint of having a boiling point suitable for operating the refrigerating cycle such as room air conditioner, refrigerator or the like. Further, since the room air-conditioner employs a refrigerating cycle with a relatively large amount of the refrigerant circulated and reduction in the amount of the refrigerant is required, it is particularly preferable to use propane.

As these refrigerant, any commercially available products may be used.

Then, the refrigeration lubricant is explained in the followings. The refrigeration lubricant constituting the working fluid in accordance with the present invention is ester refrigeration lubricant including carbonate. Specifically, it designates a refrigeration lubricant containing, as its main component, a chain (linear) or a cyclic carbonate compound or a cyclic ester compound, i.e., liquid substance (oil) having a carbonate ester bond or a liquid substance having a ester bond in its ring.

The object of the present invention is to reduce the weight of the refrigerant which dissolves in the refrigeration lubricant in the compressor of the refrigerating cycle equipment during operation and does not directly contribute to the circulation of the refrigerating cycle, by using the refrigeration lubricant which is hardly compatible with the above-mentioned refrigerant.

In other word, the object is improvement in the utilization efficiency of the refrigerant in the refrigerating cycle equipment. Then, the present invention uses the ester compound which is incompatible with the above-mentioned non-polar hydrocarbon refrigerant as the main component of the refrigeration lubricant, because it has a high polarity due to its cyclic structure with the carbonate ester bond or the ester bond having a large polarizability therein.

a hydrocarbon group having 2 to 10 carbon atoms and an ether bond, and each of l, m and n is independently an integer of not less than 0 (wherein l, m and n are not 0 at the same time).

Among the chain carbonate compounds represented by the formula (1), it is preferable to use, for instance, a chain carbonate compound, which is produced by using (poly) alkylene glycol as its raw material diol, represented by one of the formulas (9) to (13):

(9)

(10)

(11)

(12)

(13)

As such ester compounds, chain carbonate compounds, cyclic carbonate compounds and cyclic ester compounds are exemplified.

The chain carbonate compounds may be exemplified as the compound represented by the formula (1):

(1)

wherein $R^1$ is a methyl group, an ethyl group, an n-propyl group, an iso-propyl group, an n-butyl group, a sec-butyl group or a t-butyl group, each of $R^2$, $R^3$ and $R^4$ is independently a hydrocarbon group having 2 to 5 carbon atoms or from the viewpoint of their high polarity due to a heteroatom and capability of decreasing the solubility of the hydrocarbon refrigerant.

These chain carbonate compounds can be prepared by, for instance, the process which will be described below.

In first, a dicarbonate such as dimethyl carbonate, diethyl carbonate, di-n-propyl carbonate, di-iso-propyl carbonate, di-n-butyl carbonate, di-sec-butyl carbonate, di-tert-butyl carbonate or the like is allowed to react with a polyol as described below while heating in the presence of a basic catalyst. At the reaction, by removing an alcohol produced during the reaction from the reaction system through distillation, a reaction yield of not less than 95% is attained.

As the polyol, there may be exemplified ethylene glycol, propylene glycol, neopentyl glycol, polyethylene glycol, polypropylene glycol, a copolymer of ethylene glycol and propylene glycol, glycerol, diglycerol, 1,2,4-butane triol, and 1,2,6-hexane triol.

As the basic catalyst, there may be exemplified an alkali metal hydroxide such as sodium hydroxide or potassium hydroxide, an alkali metal carbonate such as sodium carbonate, sodium hydrogen carbonate or potassium carbonate, and an alkali metal alcoholate such as sodium methoxide, potassium methoxide or sodium ethoxide. Among them, it is preferable to use the alkali metal alcoholate from the viewpoints that securing a sufficient solubility in the reaction solution can be achieved and that the residual catalyst can be easily removed because counter ions which have not been removed are combined with hydrogen atom to convert into an alcohol at the time of removing the residue after the reaction by a cation exchange.

The chain carbonate compounds obtained in the above-mentioned manner may be treated in a conventional process by using an absorbent such as activated clay, active charcoal or the like to remove minute amount of impurity. In particular, since minute amounts of ionic compounds and polar compounds can be removed by such treatment, it is possible to maintain the obtained chain carbonate compound stable.

In case where the chain carbonate compound has a bonding moiety which contains a hetero-atom such as ether bond, ester bond, amide bond, urea bond or the like in the moiety other than the carbonate ester bond, the polarity of the compound becomes higher and the compound becomes hardly compatible with the above-mentioned refrigerant.

In addition, it is also possible to obtain the carbonate compound by allowing a cyclic ether compound such as epoxide compound, oxetane compound or the like with carbon dioxide as described in the followings.

Then, the cyclic carbonate compound or the cyclic ester compound is explained. The cyclic carbonate compound or the cyclic ester compound used in the present invention is those represented by the formula (2):

(2)

wherein X is a methylene group or an oxygen atom, each of $R^5$ and $R^6$ is a hydrogen atom or a methyl group, $R^7$ does not exist or is —$CH_2O$—, —$CH_2O(CH_2CH_2O)_p$—$(CH_2CHCH_3O)_q$, or —$CH_2O\{COO—(CH_2CH_2O)_p\}_r\{COO—(CH_2CHCH_3O)_q\}_s$— (wherein, p and q are not 0 at the same time and each is an integer of 0 to 3 independently, r and s are not 0 at the same time and each is an integer of 0 to 2 independently), A is a hydrogen atom or an alcohol residue of hydric value β, α is an integer of 0 to 2, and β represents an integer of 0 to 4.

Among them, it is particularly preferable to use propylene carbonate, butylene carbonate or γ-butyrolactone from the viewpoints that it has a simple structure and relatively high chemical stability, and that it is available in high quality with low prices because they are commercial and generally used solvent for the electrolytic solution of cells, the polymer substances and the like.

In case of using at least one selected from the group consisting of propylene carbonate, butylene carbonate and γ-butyrolactone as the cyclic carbonate compound represented by the formula (2), it is preferable to employ at least one of polyalkylene glycol compound represented by the formula (8):

(8)

D is a hydrogen atom or wherein z is a hydrogen atom or a monohydric alcohol residue, and t and u are an integer of 0 to 20 (wherein t+u≧2) and 1 is an integer of 1 to 4.

Since the propylene carbonate, butylene carbonate and γ-butyrolactone have a relatively low viscosity, there is a problem that they do not have a sufficient lubricating property and do not demonstrate a sufficient sealing performance at the compressing parts. For that reason, by adding polyalkylene glycol compounds represented by the aforementioned formula (8), it is possible to increase the viscosity required for the refrigeration lubricant without greatly deteriorating the property of the carbonate compound which is hard to dissolve the hydrocarbon refrigerant. Thereby, it is possible to permit the carbonate compound to readily apply to the various kinds of refrigerating cycle equipments which operate under the different conditions.

The polyalkylene glycol compound represented by the formula (8) having an end group of hydroxyl group or 1,3-dioxorane-2-one structure do not migrate into a hydrocarbon refrigerant-rich liquid phase due to their peculiarity of the end polar group, and can increase the viscosity of the refrigeration lubricant which is constituted with at least one selected from the group consisting of propylene carbonate, butylene carbonate and γ-butyrolactone.

The amount of the above-mentioned polyalkylene glycol compound may be in a range wherein a low solubility is kept or no compatibility is demonstrated for obtaining an appropriate viscosity, from the viewpoint that when the content of the polyalkylene glycol compound becomes large, a part or whole of the refrigeration lubricant is readily compatible with the hydrocarbon refrigerant. Preferably, it is in a range of 1 to 50 wt % for the refrigeration lubricant.

As the cyclic carbonate compound represented by the formula (2), it is preferable to use, for instance, those represented by the formula (3):

(3)

the formula (4):

(4)

the formula (5):

(5)

or the formula (6):

(6)

from the viewpoints that a polar group is contained in a moiety other than the ring which has the carbonate bond and that a polarity is high and solubility of the hydrocarbon refrigerant is small, due to the large number of the carbon atoms constituting the carbonate bond moiety to the whole carbon atom number.

Further, among the cyclic carbonate compound or the cyclic ester compound represented by the formula (2), those having a specific dielectric constant of 40 to 100 at 25° C. are particularly preferable.

In case where the specific dielectric constant of the compound is not less than 40 at 25° C., the solubility of the hydrocarbon refrigerant having 2 to 4 carbon atoms and no halogen atom in the refrigeration lubricant becomes small, and the hydrocarbon refrigerant and the refrigeration lubricant are incompatible with each other in the liquid phase. In other words, the resultant liquid phase separates into two layers, i.e. the hydrocarbon refrigerant-rich layer and the refrigeration lubricant-rich layer, or into three layers having an intermediate layer with the mentioned two layers. For that reason, the amount of the refrigeration lubricant which flows through the parts other than compressor in the refrigerating cycle decreases, and it is possible to also reduce the amount of the refrigeration lubricant.

In addition, from the viewpoints that the volumetric resistivity is not excessively small and the leakage current is not excessively large in the refrigerating cycle equipment, a compound having a specific dielectric constant at 25° C. of 40 to 80 is particularly preferable.

As the cyclic carbonate compounds having a specific dielectric constant of 40 to 80 at 25° C., there may be exemplified propylene carbonate, butylene carbonate, γ-butyrolactone, 1,2-bis-[(2-oxo-1,3-dioxolan-4-yl)methoxy]ethane represented by the formula (3) wherein $R^8$ is ethylene, 1,2-bis-[(2-oxo-1,3-dioxolan-4-yl)methoxy]propane represented by the formula (3) wherein $R^8$ is 1,2-propylene, and 4-[(2-methoxy-1-methylethoxy)methyl]-1,3-dioxolane-2-one represented by the formula (6) wherein $R^{11}$ is hydrogen atom and $R^{12}$ is a methyl group, and the like.

The above-mentioned cyclic carbonate compound has a cyclic carbonate moiety (or cyclic ester moiety) of 5 to 7 members in their molecule. A negative charge is distributed on an oxygen atom of a carbonyl group which extends from the cyclic structure, and a positive charge is distributed on a carbon atom of the carbonyl group. In addition, a weak positive charge is distributed on a carbon atom of the other ring. For that reason, a dipole moment at the cyclic carbonate moiety becomes very large. As a result, the compound consisting of these cyclic carbonate moiety, or the cyclic carbonate compound produced by linking these moieties with a polar bond such as (poly)ether bond, (poly)carbonate bond or the like has high polarity and, thus, a property of hardly dissolving the non-polar hydrocarbon refrigerant.

These cyclic carbonate compounds can readily be synthesized by allowing, for instance, ethylene glycol diglycidyl ether, propylene glycol diglycidyl ether, neopentyl glycol diglycidyl ether, diglycidyl ether of trimethylol propane, glycerol diglycidyl ether, polyethylene glycol diglycidyl ether, polypropylene glycol diglycidyl ether, adipic acid diglycidyl ester, triglycidyl ether of trimethylol propane, glycerol triglycidyl ether, pentaerythritol triglycidyl ether, pentaerythritol tetraglycidyl ether, and the like to react with carbon dioxide in the presence of a catalyst.

In particular, the cyclic carbonate compounds represented by the formulae (3), (4) and (5) can be synthesized by using, for instance, ethylene glycol diglycidyl ether, diethylene glycol diglycidyl ether, dipropylene glycol diglycidyl ether, propylene glycol diglycidyl ether, triglycidyl ether of trimethylol propane, glycerol triglycidyl ether, pentaerythritol triglycidyl ether, and pentaerythritol tetraglycidyl ether, as their raw material (starting) cyclic ether.

As the catalyst used in the above-mentioned reaction, there may be exemplified an organic zinc catalyst or an inorganic catalyst such as diethyl zinc/γ-alumina, zinc carbonate, zinc acetate, cobalt acetate, zinc chloride/tetrabutylammonium bromide and the like; and an aluminum compound catalyst such as triethyl aluminum/Lewis base, diethyl aluminum diethylamide, α, β, γ, δ-tetraphenyl porphinato aluminum methoxide and the like. These catalysts can be obtained by, for instance, allowing a dialkyl zinc or a dialkyl magnesium to react with a dihydric activated hydrogen compound such as water, a primary amine, a dihydric phenol, an aromatic dicarboxylic acid, an aromatic hydroxyl carboxylic acid or the like in 1:1 molar ratio.

In addition, in case where the cyclic carbonate compound is synthesized in the above-mentioned manner, the obtained cyclic carbonate compound may be separated from the residual catalyst by distillation under reduced pressure or a treatment with an amphoteric ion exchange resin.

In the-synthesis in particular, from the viewpoints of suppressing the generation of by-product and the amount of a catalyst component which is harmful in case of remaining in the refrigeration lubricant, it is preferable to perform the reaction in the presence of the tetraalkyl ammonium bromide catalyst in an amount of 0.01 to 1 wt % to the raw material glycidyl ether, under a carbon dioxide atmosphere of high pressure at 100 to 180° C.

It is further preferable to prepare the cyclic carbonate compound in the process as described below.

That is, it is preferable to prepare the cyclic carbonate compound by the steps of:

(a) allowing a cyclic ether compound represented by the formula (7):

(7)

wherein each of $R^5$ and $R^6$ is independently a hydrogen atom or a methyl group, $R^7$ does not exist or is —$CH_2O$—, —$CH_2O(CH_2CH_2O)_p$—$(CH_2CHCH_3O)_q$ or —$CH_2O\{COO—(CH_2CH_2O)_p\}_r$—$\{COO—(CH_2CHCH_3O)_q\}_s$—(wherein p and are not 0 at the same time and each is an integer of 0 to 3 independently, r and S are not 0 at the same time and each is an integer of 0 to 2 independently), A is a hydrogen atom or an alcohol residue of hydric value β, α is an integer of 0 to 2, and β is an integer of 0 to 4, to react with carbon dioxide in the presence of a tetra-alkylammonium halide catalyst in an amount of not more than 0.1 mol %, (b) removing said catalyst from the reaction product by washing with an acidic aqueous solution and then with water, and (c) removing residual cyclic ether compound from the washed and dried reaction product by evaporation.

The reason for this is that the utilization of the tetra-alkylammonium halide catalyst is inferior in the reaction rate as compared to a case of utilizing a catalyst of zinc or aluminum, but is preferable from the viewpoint that by-product polymers are produced in only small amount.

The tetra-alkylammonium halide catalyst is not particularly limited but may be exemplified as tetramethylammonium chloride, tetraethylammonium chloride, tetrapropylammonium chloride, tetra-n-butylammonium chloride, tetrapentylammonium chloride, tetrahexylammonium chloride, tetramethylammonium bromide, tetraethylammonium bromide, tetrapropylammonium bromide, tetra-n-butylammonium bromide, tetrapentylammonium bromide, tetrahexylammonium bromide, tetramethylammonium iodide, tetraethylammonium iodide, tetrapropylammonium iodide, tetra-n-butylammonium iodide, tetrapentylammonium iodide, tetrahexylammonium iodide, and the like. In case where the alkyl group is an ethyl group or a methyl group, it is preferable from the viewpoint-that the catalyst is relatively easily transferred into an aqueous phase by washing with water after the reaction due to its high solubility in water. In case where the solubility into the epoxy compound raw material is not sufficient, a tetraalkylammonium halide having an alkyl group with many carbon atoms may be used.

In contrast thereto, a tetraalkyl ammonium halide catalyst, which is usually used in a water-oil heterogeneous reaction system as a phase transfer catalyst has function like a surfactant. Thus, it is difficult to separate the water layer and the oil layer which contains the cyclic carbonate compound by normal washing with water for removing the salt. In addition, if heating is performed on the reaction system for removing the cyclic ether compound by evaporation while permitting the tetraalkyl ammonium halide catalyst to remain in the system, there arises a problem that the produced cyclic carbonate compound unintentionally decomposes.

In the above-mentioned method, however, by performing washing with an acidic aqueous solution such as hydrochloric acid aqueous solution or the like, it is possible to suppress the function similar to surfactant and to remove the catalyst by taking into the phase of the acidic aqueous solution. In addition, by a subsequent washing with water, it is possible to reduce an acidic component incorporated into the oil layer. By removing the catalyst in this manner, it is possible to suppress the decomposition of the product of the cyclic carbonate compound even if heating required for removing the above-mentioned remaining cyclic ether compound by evaporation is performed, and it is possible to obtain a cyclic carbonate compound of high purity.

In particular, the epoxide compound as the raw material for the cyclic carbonate compound is regarded to have detrimental effect on the living body, though there is certain difference of degree in the effect according to its structure. It is therefore particularly preferable to employ such producing method in order to prevent the residuary of the epoxide compound in the refrigeration lubricant and its production by the decomposition of the cyclic carbonate compound.

The refrigeration lubricant used in the present invention contains the above-mentioned carbonate compound as a main component. In this case, the refrigeration lubricant may contain one, or two or more of the above-mentioned carbonate compounds as far as it does not deteriorate the effect of the present invention.

In addition, the refrigeration lubricant used in the present invention may contain a by-product of the above-mentioned carbonate compound and may further contain, as an arbitrary component, the known lubricant oil additives such as detergent dispersant, anti-oxidant, withstand load additive, oiliness improver, pour point-depressant, acid/water trapping agent, anti-foaming agent or the like as described, for instance, in "Petroleum Product Additives" by Toshio Sakurai, published from Saiwai Shoboh, in 1964, in a range which does not deteriorate the effect of the present invention.

The content of the above-mentioned carbonate compound in the refrigeration lubricant may be 50 to 99.9 wt % from the viewpoint that incompatibility as the refrigeration lubricant with the hydrocarbon refrigerant can be maintained. It is preferable to contain 75 to 99.9 wt % from the viewpoint of maintaining the solubility of the hydrocarbon refrigerant sufficiently low.

In addition, the dynamic (kinematic) viscosity of the refrigeration lubricant at 40° C. is preferably $5\times10^{-6}$ to $4\times10^{-5} m^2/s$. Since the hydrocarbon refrigerant is hard to dissolve in the refrigeration lubricant in the working fluid of the present invention, a decrease in the viscosity due to the dissolving of the refrigerant is small. And, therefore, the dynamic viscosity of the above-mentioned range is preferable for the efficiency of the refrigerating compressor operating on the working fluid. Further, the dynamic viscosity can be adjusted by the addition of the polyalkylene glycol compounds represented by the formula (8), for example.

The working fluid for refrigerating cycle equipment of the refrigerant compression-type in accordance with the present invention can be prepared by combining the above-mentioned refrigerant with the refrigeration lubricant in a conventional manner.

At that time, it is preferable that the saturation solubility at 70° C. of the hydrocarbon refrigerant having 2 to 4 carbon atoms and no halogen atom to the refrigeration lubricant is in a range from 0.1 to 5 wt % when the vapor pressure of the above-mentioned refrigerant is 1.77 MPa. This reflects a greater effect on the reduction of the required amount of the refrigerant in the refrigerating cycle equipment. Further, it is particularly preferable that the saturation solubility is in a range from 0.1 to 3 wt %.

In the working fluid for refrigerating cycle equipment of the refrigerant compression-type, since the specific gravity of the hydrocarbon refrigerant having 2 to 4 carbon atoms and no halogen atom is small, the refrigerant which has phase-separated in the refrigerant compressor exists in an upper layer of the refrigeration lubricant. Therefore, the oiling to the sliding parts of the refrigerant compressor can be performed by sending a liquid component pumped up from around the inside bottom of the compressor. Further, since the dissolved amount of the refrigerant is small, it is possible to supply a liquid composition with rich refrigeration lubricant component and, thus, to drive the sliding part with a high reliability.

In addition, in the refrigerating cycle equipment of refrigerant compression-type which uses the working fluid comprising the refrigeration lubricant of the ester or carbonate compound and the hydrocarbon refrigerant having 2 to 4 carbon atoms and no halogen atom, the amount of the refrigerant required for permitting the same equipment to demonstrate the same refrigerating performance is small as compared with a conventional refrigerating cycle equipment, which uses a working fluid comprising a mineral oil or an alkylbenzene oil as the refrigeration lubricant wherein the above-mentioned hydrocarbon refrigerant dissolves in a large quantity.

Namely, the present invention is also concerned with the refrigerating cycle equipment which uses the above-mentioned working fluid for the refrigerating cycle equipment of refrigerant compression-type. As the refrigerating cycle equipment to be used in the present invention, there are, for example, refrigerating cycle equipments which use the refrigerant by compressing it such as air conditioners, electric refrigerators (freezers), refrigerating or freezing ware houses, refrigerating show cases and the like.

In the following paragraphs, a description will be made on an example of the refrigerating cycle equipment to which the present invention is applied.

Figure 1:
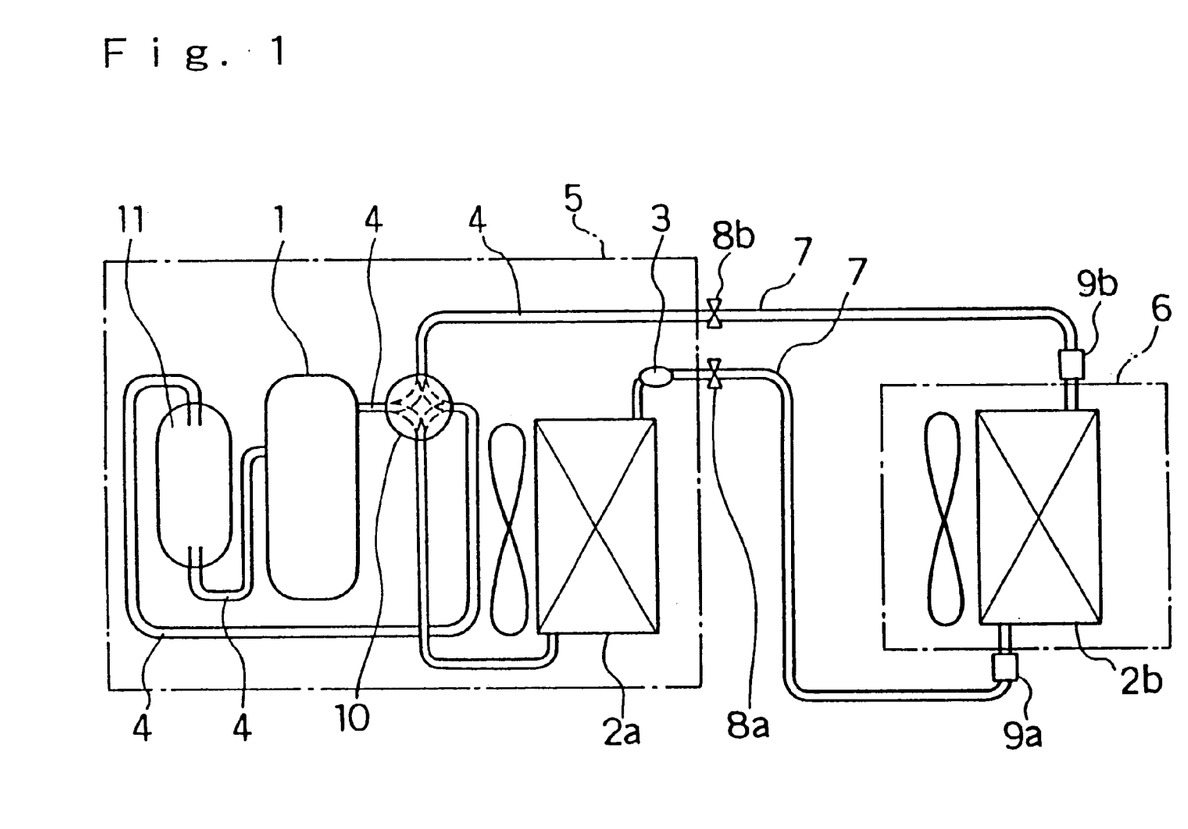
FIG. 1 is a schematic view showing an embodiment of a refrigerating cycle equipment in one example of the present invention.

FIG. 1 is a schematic view of an air conditioner, one example of the refrigerating cycle equipment. As shown, an outdoor unit 5 comprises a refrigerant compressor 1, a heat-transfer unit 2a, a refrigerant flow control unit 3 such as a capillary tube or an expansion valve, and a pipeline 4 for connecting these components. The outdoor unit 5 is connected to an indoor unit 6 having a heat-transfer unit 2b installed in a part where the air-conditioning is to be performed, through a connecting pipe 7, valves 8a and 8b, and with flare connectors 9a and 9b. A four-way valve 10 is provided for switching (exchanging) the functions of the heat-transfer unit 2a and 2b directed to the condensing or evaporating of the refrigerant. In addition, an accumulator 11 may be provided.

At cooling operation, the refrigerant which has been compressed by the refrigerant compressor 1 releases its heat at the heat-transfer unit 2a and liquefies, and then becomes a gas/liquid mixed refrigerant of low temperature by passing through the refrigerant flow control unit 3. Thereafter, it absorbs heat and vaporizes at the heat-transfer unit 2b in the indoor unit 5, and thereafter, it continues to take a cycle of being sucked up again into the refrigerant compressor 1. When the flow path is switched by rotating the four-way vale 10, a warming operation is brought, whereby the refrigerant is condensed at the heat-transfer unit 2b and evaporated at the heat-transfer unit 2a.

The refrigerating cycle equipment in accordance with the present invention is not necessarily limited to a refrigerating cycle equipment capable of performing a cooling operation and a warming operation as shown by FIG. 1, and alternatively, may be a refrigerating cycle for cooling only or warming only incapable of exchanging the functions of the heat-transfer units by the four-way valve.

As described previously, although there is no need for peculiarly configuring the refrigerating cycle equipment to which the present invention is embodied, the equipment may preferably be provided with a device for detecting the leakage of the refrigerant.

In the following paragraphs, the present invention will be described in more specific manner by way of example, but the present invention should not be limited to the content of the description.

PREPARATIVE EXAMPLE 1

Into a 1-liter flask provided with a distilling column, 59 g (0.9 mol) of ethylene glycol, 591 g (5.0 mol) of diethyl carbonate and 0.5 g (0.003 mol) of a 28 wt % methanol solution of sodium methoxide were charged, and heated under ordinary pressure at 110 to 150° C. for 8 hours, thereby to remove the ethanol produced during the reaction from the mixture by evaporation. Thereafter, by elevating the temperature up to 200° C. under reduced pressure, the residual diethyl carbonate was removed by evaporation.

After diluting the obtained reaction mixture by adding 500 g of tetrahydrofuran, the residual catalyst was neutralized and removed by passing the mixture through a column filled with an ion exchange resin (Amberlist 15 available from Organo Co., Ltd.), and thereafter the tetrahydrofuran was distilled out, to give a chain carbonate compound 1 represented by the aforementioned formula (9).

PREPARATIVE EXAMPLE 2

Into a 1-liter flask provided with a distilling column, 25 g (0.4 mol) of ethylene glycol, 53 g (0.5 mol) of diethylene glycol, 450 g (5.0 mol) of dimethyl carbonate and 0.5 g (0.003 mol) of a 28 wt % methanol solution of sodium methoxide were charged, and heated under ordinary pressure at 110 to 150° C. for 8 hours, thereby to remove the methanol produced during the reaction from the mixture by evaporation. Thereafter, by elevating the temperature up to 180° C. under reduced pressure, the remaining dimethyl carbonate was removed by evaporation.

After diluting the obtained reaction mixture by adding 500 g of tetrahydrofuran, the residual catalyst was neutralized and removed by passing the mixture through a column filled with the same ion exchange resin as that in PREPARATIVE EXAMPLE 1, and thereafter the tetrahydrofuran was distilled out to give a chain carbonate compound 2 represented by the aforementioned formula (10).

PREPARATIVE EXAMPLE 3

Into a 2-liter flask provided with a distilling column, 22.8 g (0.3 mol) of propylene glycol, 75 g (0.5 mol) of triethylene glycol, 10.4 g (0.1 mol) of neopentyl glycol, 1091 g (5.0 mol) of di-tert-butyl carbonate and 0.5 g (0.003 mol) of a 28 wt % methanol solution of sodium methoxide were charged, and heated under ordinary pressure at 110 to 150° C. for 8 hours to remove the tert-butanol produced during the reaction from the mixture by evaporation. Thereafter, by elevating the temperature up to 230° C. under reduced pressure, the remaining di-tert-butyl carbonate was removed by evaporation.

After diluting the obtained reaction mixture by adding 500 g of tetrahydrofuran, the residual catalyst was neutralized and removed by passing the mixture through a column filled with the same ion exchange resin as that in PREPARATIVE EXAMPLE 1, and thereafter the tetrahydrofuran was distilled out to give a chain carbonate compound 3 represented by the aforementioned formula (11).

PREPARATIVE EXAMPLE 4

Into a 1-liter flask provided with a distilling column, 55.9 g (0.9 mol) of ethylene glycol, 450 g (5.0 mol) of dimethyl carbonate and 0.5 g (0.003 mol) of a 28 wt % methanol solution of sodium methoxide were charged, and heated under ordinary pressure at 110 to 150° C. for 8 hours to remove the methanol produced during the reaction from the mixture by evaporation. Thereafter, by elevating the temperature up to 230° C. under reduced pressure, the remaining diethyl carbonate was removed therefrom by evaporation.

After diluting the obtained reaction mixture by adding 500 g of tetrahydrofuran, the residual catalyst was neutralized and removed by passing the mixture through a column filled with the same ion exchange resin as that in PREPARATIVE EXAMPLE 1, and thereafter the tetrahydrofuran was distilled out to give a chain carbonate compound 4 represented by the aforementioned formula (12).

PREPARATIVE EXAMPLE 5

A 300 ml autoclave with a stirrer was charged with 18 g (0.2 mol) of dioxane, 4.4 g (0.1 mol) of ethylene oxide, 5.9 g (0.1 mol) of propylene oxide, and 9 ml of 1M hexane solution of diethyl zinc, filled with carbon dioxide at 1 Pa, and allowed to stand for one day.

After diluting the obtained reaction mixture by adding 100 g of tetrahydrofuran, the residual catalyst was neutralized and removed by passing the mixture through a column filled with the same ion exchange resin as that in PREPARATIVE EXAMPLE 1, and thereafter the tetrahydrofuran and dioxane were distilled out to give a chain carbonate compound 5 represented by the aforementioned formula (13).

EXAMPLES 1 TO 5

By mixing 0.4 g or 1.6 g of each chain carbonate compounds 1 to 5 obtained in the above-mentioned manner with 1.6 g of propane refrigerant to obtain the working fluids 1 to 5 for refrigerating cycle equipment in accordance with the present invention. Then, each of the working fluids was sealed in a glass tube and shaken and stirred sufficiently, and after the lapse of 10 seconds, the state of the phase of the working fluid was observed.

The results thereof are listed in Table 1. In Table 1, there are also shown ratios of carbon (atom %) constituting the carbonate ester bond in the compounds. The ratio of carbon constituting the carbonate ester bond is calculated on the basis of-the value obtained in $^{13}$C-NMR.

TABLE 1

| | Ratio of carbon constituting the carbonate ester bond (atom %) | State of the phase of the working fluid |
| --- | --- | --- |
| Example 1 | 28 | Separated |
| Example 2 | 27 | Separated |
| Example 3 | 14 | Suspended |
| Example 4 | 33 | Separated |
| Example 5 | 26 | Separated |

Further, for evaluating the performances of the working fluids produced in the above-mentioned examples, the following test was conducted.

200 g of a mineral oil (SUNISO 4GS, available from Japan Sun Oil Co., Ltd.) or each chain carbonate compounds 1 to 5 obtained in the above-mentioned manner was used as a refrigeration lubricant in a single unit-type air conditioner, and their performances are comparatively investigated.

In first, a standard was established by measuring the performance of an air conditioner with 200 g of the mineral oil as its refrigeration lubricant and 350 g of the refrigerant R290 (propane) sealed therein. Then, an operation of extracting the refrigerant little by little from the refrigerating cycle was repeated on the air conditioner, while measuring the performance of the air conditioner.

As the result, it was found that in case of using any one of the chain carbonate compounds 1 to 5, almost the same performance as that of the standard can be attained with approximately 220 g of the refrigerant R290 (propane).

PREPARATIVE EXAMPLE 6

Into a 1-liter flask provided with a distilling column, 20 g (0.3 mol) of ethylene glycol, 55 g (0.6 mol) of glycerol, 591 g (5.0 mol) of diethyl carbonate and 0.5 g (0.003 mol) of a 28 wt % methanol solution of sodium methoxide were charged, and heated under ordinary pressure at 110 to 150° C. for 8 hours to remove the ethanol produced during the reaction from the mixture by evaporation. Thereafter, by elevating the temperature up to 200° C. under reduced pressure, the residual diethyl carbonate was removed by evaporation.

After diluting the obtained reaction mixture by adding 500 g of tetrahydrofuran, the residual catalyst was neutralized and removed by passing the mixture through a column filled with the same ion exchange resin as that in PREPARATIVE EXAMPLE 1, and thereafter the tetrahydrofuran was distilled out to give a composition containing about 62 wt % of a cyclic carbonate compound 1 represented by the formula (14):

(14)

The other components in the composition are considered to be chain carbonate compounds or branched-chain carbonate compounds whose end groups with alcohol residue are ethyl groups.

PREPARATIVE EXAMPLE 7

Into a 1-liter flask provided with a distilling column, 12 g (0.2 mol) of ethylene glycol, 41 g (0.4 mol) of diethylene glycol, 53 g (0.5 mol) of 1,2,4-butane triol, 450 g (5.0 mol) of dimethyl carbonate and 0.5 g (0.003 mol) of a 28 wt % methanol solution of sodium methoxide were charged, and heated under ordinary pressure at 110 to 150° C. for 8 hours to remove the methanol produced during the reaction from the mixture by evaporation. Thereafter, by elevating the temperature up to 180° C. under reduced pressure, the residual dimethyl carbonate was removed by evaporation.

After diluting the obtained reaction mixture by adding 500 g of tetrahydrofuran, the residual catalyst was neutralized and removed by passing the mixture through a column filled with the same ion exchange resin as that in PREPARATIVE EXAMPLE 1. Then, the tetrahydrofuran was distilled out to give a composition containing about 54 wt % of a cyclic carbonate compound 2 represented by the formula (15):

(0.0032 mol) of tetrabutylammonium bromide, filled with carbon dioxide at 4 MPa, and allowed to stand in an oil bath at 150° C. for 10 hours.

By distilling the obtained reaction mixture under reduced pressure, a cyclic carbonate compound 3 (dicarbonate) represented by the formula (17):

was obtained.

The other components in the composition are considered to be chain carbonate compounds or branched-chain carbonate compounds whose end groups with alcohol residue are methyl groups.

PREPARATIVE EXAMPLE 8

Into a 2-liter flask provided with a distilling column, 22.8 g (0.3 mol) of propylene glycol, 45 g (0.3 mol) of triethylene glycol, 9.2 g (0.1 mol) of glycerol, 1091 g (5.0 mol) of di-tert-butyl carbonate and 0.5 g (0.003 mol) of a 28 wt % methanol solution of sodium methoxide were charged, and heated under normal pressure at 110 to 150° C. for 8 hours to remove the tert-butanol produced during the reaction from the mixture by evaporation. Thereafter, by elevating the temperature up to 230° C. under reduced pressure, the residual di-tert-butyl carbonate was removed by evaporation.

After diluting the obtained reaction mixture by adding 500 g of tetrahydrofuran, the residual catalyst was neutralized and removed by passing the mixture through a column filled with the same ion exchange resin as that in PREPARATIVE EXAMPLE 1. Then, the tetrahydrofuran was distilled out to give a chain carbonate compound 6 having a copolymerization rate shown in the formula (16):

PREPARATIVE EXAMPLE 9

A 300 ml autoclave with a stirrer was charged with 17.4 g (0.1 mol) of ethylene glycol diglycidyl ether and 1.03 g

PREPARATIVE EXAMPLE 10

A 300 ml autoclave with a stirrer was charged with 26.2 g (0.1 mol) of triethylene glycol diglycidyl ether, 2.5 g (0.018 mol) of zinc chloride and 10.3 g (0.0032 mol) of tetrabutylammonium bromide, filled with carbon dioxide at 4Pa, and allowed to stand for one day.

After diluting the obtained reaction product by adding 100 g of methanol, the residual catalyst was removed by passing the mixture through a column filled with an amphoteric ion exchange resin (Retardion available from Dow Chemical Co. Ltd.). Thereafter, by distilling out the produced methanol, a composition containing 95 wt % of a cyclic carbonate compound 4 (dicarbonate) represented by the formula (18):

was obtained. The other components in the composition are compounds whose the epoxide group at one end was not carbonated.

PREPARATIVE EXAMPLE 11

A 300 ml autoclave with a stirrer was charged with 30.2 g (0.1 mol) of triglycidyl ether of trimethylol propane and 1.55 g (0.0054 mol) of tetrabutylammonium bromide, filled with carbon dioxide at 5Pa, and allowed to stand in an oil bath at 170° C. for 3 hours.

After diluting the obtained reaction product by adding 100 g of methanol, the residual catalyst was removed by passing the mixture through a column filled with the amphoteric ion exchange resin which is the same as that in PREPARATIVE EXAMPLE 10. Thereafter, by distilling out the produced methanol, a composition containing 86 wt % of a cyclic carbonate compound 5 (tricarbonate) represented by the formula (19):

(19)

was obtained. The other components in the composition are compounds which are produced by carbonating diglycidyl ether contained as an impurity in the raw materials.

PREPARATIVE EXAMPLE 12

A 300 ml autoclave with a stirrer was charged with 36.4 g (0.1 mol) of pentaerithritol tetraglycidyl ether and 0.21 g (0.0006 mol) of tetraethylammonium bromide, filled with carbon dioxide at 5 Pa, and allowed to stand in an oil bath at 170° C. for 3 hours.

After diluting the obtained reaction product by adding 100 g of methanol, the residual catalyst was removed by passing the mixture through a column filled with the amphoteric ion exchange resin which is the same as that in PREPARATIVE EXAMPLE 10. Thereafter, by distilling out the produced methanol, a composition containing 60 wt % of a cyclic carbonate compound 6 (tetracarbonate) represented by the formula (20):

(20)

at 60 wt % was obtained. The other components in the composition are found to be carbonate compounds of diglycidyl ether or triglycidyl ether, which are impurities contained in the raw materials, and partly carbonated compounds of these impurities and the raw material.

PREPARATIVE EXAMPLE 13

A 300 ml autoclave with a stirrer was charged with 100 g (0.531 mol) of 2-methoxy-1-methylethylglycidyl ether and 0.021 g (0.0001 mol) of tetramethylammonium iodide, filled with carbon dioxide at 5Pa, and allowed to stand in an oil bath at 120° C. for 15 hours.

After diluting the obtained reaction product by adding 100 g of chloroform, the residual catalyst was removed by washing with water. Then, after by drying with magnesium sulfide and by evaporating the mixture to remove chloroform, the residual raw material was further distilled out by heating the mixture under reduced pressure, thereby to give a cyclic carbonate compound 7 represented by the formula (21):

(21)

EXAMPLES 6 TO 13

By mixing 0.4 g or 1.6 g of the chain carbonate compound 6 or each of compositions containing, as their main components, the cyclic carbonate compounds 1 to 7 obtained in the above-mentioned manner with 1.6 g of propane refrigerant the working fluids for refrigerating cycle equipment 6 to 13 in accordance with the present invention were obtained. Then, each of the working fluids was sealed in a glass tube and shaken and stirred sufficiently, and after the lapse of 1 second, the state of the phase of the working fluid was observed. Ratios of carbon (atom %) constituting the carbonate ester bond in the compounds were calculated on the basis of the value obtained in $^{13}C$-NMR. The results are listed in Table 2.

In addition, dielectric constants at 25° C. of the working fluids were measured according to the specific dielectric constant test in "Test Method for Electric Insulator Oil" stipulated in JIS C-2101 with the exception of the measurement temperature condition. Further, saturation solubilities of the propane refrigerant in the above-mentioned refrigeration lubricants at 70° C. under the vapor pressure of the propane refrigerant of 1.77 MPa were also measured in compliance with a method as follows. Namely, the refrigeration lubricant and the propane refrigerant are charged in an autoclave provided with a stirrer and a liquid specimen is sampled from the bottom of the autoclave while maintaining the atmosphere of the autoclave at 70° C. The composition of the liquid specimen is then analyzed. The results of these measurements are also shown in Table 2.

TABLE 2

| | Ratio of carbon constituting the carbonate ester bond (atom %) (atom %) | State of the phase of the mixture | Specific Dielectric constant (25° C.) | Saturation solubility (wt %) |
|---|---|---|---|---|
| Example 6 | 28 | Separated | 43 | 4.0 |
| Example 7 | 27 | Separated | 41 | 4.3 |
| Example 8 | 14 | Suspended | 39 | 4.7 |
| Example 9 | 20 | Separated | 73 | 2.5 |
| Example 10 | 14 | Suspended | 55 | 4.5 |
| Example 11 | 17 | Separated in three layers | 49 | 4.0 |
| Example 12 | 19 | Separated | 43 | 4.0 |
| Example 13 | 12.5 | Separated | 58 | 4.3 |

PREPARATIVE EXAMPLE 14

By mixing 95 parts by weight of the propylene carbonate represented by the formula (22):

(22)

with 5 parts by weight of polyethylene glycol having a weight-averaged molecular weight of 1000 and hydroxyl groups on both ends thereof, and further adding 0.5 part by weight of 2,5-di-tert-butyl-4-cresol as an anti-oxidant, the refrigeration lubricant 14 in accordance with the present invention was obtained.

A result of the measurement on dynamic viscosity at 40° C. on the oil 13 revealed that it was $25 \times 10^{-6} m^2/s$.

PREPARATIVE EXAMPLE 15

By mixing 80 parts by weight of the butylene carbonate represented by the formula (24):

(24)

with 20 parts by weight of copolymer of ethylene oxide-propylene oxide represented by the formula (25):

(25)

and having a weight-averaged molecular weight of 600 and hydroxyl groups on both ends thereof, the refrigeration lubricant 15 in accordance with the present invention was obtained. A result of the measurement of the dynamic viscosity at 40° C on the refrigeration lubricant 15 revealed that it was $37 \times 10^{-6} m^2/s$.

PREPARATIVE EXAMPLE 16

The refrigeration lubricant 16 in accordance with the present invention was obtained by mixing 50 parts by weight of the dicarbonate, which was prepared in a manner similar to that in PREPARATIVE EXAMPLE 13 by using, as a raw material, polyethylene glycol glycidyl ether represented by the formula (26):

(26)

having an average degree of polymerization of about 9 at its ethylene oxide moiety, with 50 parts by weights of γ-butyrolactone represented by the formula (27):

(27)

EXAMPLES 14 TO 16

By mixing 0.4 g or 1.6 g of each of the refrigeration lubricants 14 to 16 obtained in the above-mentioned manner with 1.6 g of propane refrigerant, respectively, the working fluids for refrigerating cycle equipment 14 to 16 in accordance with the present invention were obtained. Then, each of the working fluids was sealed in a glass tube and shaken and stirred sufficiently, and after the lapse of 1 second, the state of the phase of the mixture was observed. The results thereof are listed in Table 3.

In addition, dielectric constants measured at 25° C., and saturation solubilities of the propane refrigerant in the refrigeration lubricants at 70° C. under the vapor pressure of the propane refrigerant of 1.77 MPa are also shown in Table 3.

TABLE 3

| | Ratio of carbon constituting the carbonate ester bond (atom %) (atom %) | State of the phase of the mixture | Specific Dielectric constant (25° C.) | Saturation solubility (wt %) |
|---|---|---|---|---|
| Example 14 | — | Separated | 85 | 2.1 |
| Example 15 | — | Separated | 72 | 2.4 |
| Example 16 | — | Separated in three layers | 61 | 4.1 |

EXAMPLE 17

A 300 ml autoclave with a stirrer was charged with 18.8 g (0.1 mol) of propylene glycol diglycidyl ether and 4.2 g (0.02 mol) of tetraethylammonium bromide, filled with carbon dioxide at 4 MPa, and allowed to stand in a oil bath at 120° C. for 10 hours.

By distilling out the reaction mixture as it was under reduced pressure, it was tried to distill out the remaining propylene glycol diglycidyl ether. However, the attempt was terminated because the mixture began to be colored to brown. Then, the mixture was analyzed by means of gas chromatography, thereby confirming the existences of the tetraethylammonium bromide and about 6 wt % of propylene glycol diglycidyl ether in addition to the dicarbonate represented by the formula (28):

(28)

The reaction product was named as Specimen 1.

On the other hand, another 300 ml autoclave with a stirrer was charged with 18.8 g (0.1 mol) of propylene glycol diglycidyl ether and 0.42 g (0.002 mol) of tetraethylammonium bromide, filled with carbon dioxide at 4 MPa, and allowed to stand in a oil bath at 120° C. for 10 hours.

After diluting the obtained reaction mixture with chloroform, washing by the diluted mixture with a 1N hydrochloric acid aqueous solution 3 times, and then washing it with water 3 times, the washed mixture was dried over sodium sulfide.

After removing the chloroform by evaporation from the dried mixture by using a rotary evaporator, the distilling-out of the residual propylene glycol diglycidyl ether was completed by a distillation under reduced pressure for 5 hours. A result of the analysis of this product by means of gas chromatography confirmed an existence of the propylene glycol diglycidyl ether at less than 1 wt % in addition to the dicarbonate represented by the formula (28). However, existence of the tetraethylammonium bromide was not confirmed. The reaction product was named as Sample 2.

2 g of each Sample 1 or 2 obtained in the above-mentioned manner was sealed in a glass tube and subjected to an aging at 150° C. for 2 weeks. Sample 1 was discolored to black and solidified, but Sample 2 was slightly colored to yellow but demonstrated no significant change.

As described above, a cyclic carbonate compound having a high thermal stability can be obtained according to the method of the present invention.

EXAMPLE 18

By using a mineral oil or the refrigeration lubricant obtained in PREPARATIVE EXAMPLE 14 in a single unit-type air conditioner, comparison and examination were conducted for evaluating the performances of the working fluids.

In first, a standard is established by measuring the performance of an air conditioner with 200 g of the mineral oil as its refrigeration lubricant and 350 g of the refrigerant R290 (propane) Sealed therein.

Then, an operation of extracting the refrigerant little by little from the refrigerating cycle was repeated on an air conditioner which contains the refrigeration lubricant 13 and 350 of the refrigerant R290 (propane), while continuing the measurement on the performance of the air conditioner.

As the result, it was found that in the case of using the refrigeration lubricant 13, a performance of the same degree as that of the standard can be attained with approximately 140 g of the refrigerant R290 (propane).

As described previously, according to the present invention, it is possible to obtain a working fluid which demonstrate a preferable performance even with a small filling amount of the refrigerant of hydrocarbons containing no halogen atom such as ethane, propane, butane, iso-butane and the like into the refrigerating cycle equipment. In addition, by using this working fluid, it is also possible to provide a refrigerating cycle equipment excellent In the safety against the worst case of the refrigerant leakage.

It is understood and appreciated that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A working fluid for a refrigerating cycle equipment comprising a refrigerant and a refrigeration lubricant, wherein;
   said refrigerant consists of halogen-free hydrocarbons having two to four carbon atoms, and
   said refrigeration lubricant comprises, as a main component, a compound selected from the group consisting of linear carbonate compounds, cyclic carbonate compounds, and cyclic ester compounds, wherein said compound is incompatible with said refrigerant.

2. The working fluid for a refrigerating cycle equipment in accord with claim 1, wherein the number of carbon atoms in bonds comprises at least about 10 atomic % of the total carbon atoms of said compound.

3. A refrigerating cycle equipment which uses the working fluid in accordance with claim 1.

4. The working fluid for a refrigerating cycle equipment in accordance with claim 1, wherein said linear carbonate compound is represented by the formula (1):

wherein, $R^1$ is a methyl group, an ethyl group, an n-propyl group, an iso-propyl group, an n-butyl group, a sec-butyl group or a t-butyl group,
   each of $R^2$, $R^3$ and $R^4$ is independently a hydrocarbon group having 2 to 5 carbon atoms, or a hydrocarbon group having 2 to 10 carbon atoms and an ether bond, and each of 1, m and n is independently an integer of not less than 0 wherein, 1, m and n are not 0 at the same time.

5. The working fluid for a refrigerating cycle equipment in accordance with claim 1, wherein said compound is represented by the formula (2):

wherein, X is a methylene group or an oxygen atom, each of $R^5$ and $R^6$ is independently a hydrogen atom or a methyl group, $R^7$ does not exist or is —$CH_2$—, —$CH_2O(CH_2CH_2O)_p$—$(CH_2CHCH_3O)_q$ or —$CH_2O\{COO$—$(CH_2CH_2O)_p\}_r$—$\{COO$—$(CH_2CHCH_3O)_q\}_s$—, wherein, p and q are not 0 at the same time, and each is an integer of 0 to 3 independently, r and s are not 0 at the same time, and each is an integer of 0 to 2 independently, A is a hydrogen atom or an alcohol residue of hydric value $\beta$, a is an integer of 0 to 2, and $\beta$ is an integer of 0 to 4.

6. The working fluid for a refrigerating cycle equipment in accordance with claim 5, wherein said compound is represented by the formula (3):

(3)

wherein, $R^8$ is an ethylene bond, a 2-methylethylene bond, an ethyleneoxyethylene bond, or a 2-methylethyleneoxy-2-methylethylene bond.

7. The working fluid for a refrigerating cycle equipment in accordance with claim 5, wherein said compound is represented by the formula (4):

(4)

wherein, $R^9$ is a hydrogen atom, a methyl group or a hydroxymethyl group, and $R^{10}$ is an oxygen atom or an oxymethylene group.

8. The working fluid for a refrigerating cycle equipment of in accordance with claim 5, wherein said compound is represented by the formula (5):

(5)

9. The working fluid for a refrigerating cycle equipment in accordance with claim 5, wherein said compound is represented by the general formula (6):

(6)

wherein, $R^{11}$ is a hydrogen atom or a methyl group, $R^{12}$ is a methyl group or a ethyl group and v is an integer of 1 to 3.

10. The working fluid for a refrigerating cycle equipment in accordance with claim 5, wherein said compound represented by the formula (2) is obtained by the steps of:

(a) allowing a cyclic ether compound represented by the formula (7):

(7)

wherein, each of $R^5$ and $R^6$ is independently a hydrogen atom or a methyl group, $R^7$ does not exist or is —$CH_2O$—, —$CH_2O(CH_2CH_2O)_p$—$(CH_2CHCH_3O)_q$ or —$CH_2O\{COO$—$(CH_2CH_2O)_p\}_r$—$\{COO$—$(CH_2CHCH_3O)_q\}_s$—, wherein, p and q are not 0 at the same time, and each is an integer of 0 to 3 independently, r and s are not 0 at the same time, and each is an integer of 0 to 2 independently, A is a hydrogen atom or an alcohol residue of hydric value β, α is an integer of 0 to 2, and β is an integer of 0 to 4, to react with carbon dioxide in the presence of a tetra-alkylammonium halide catalyst in an amount of not more than 0.1 mol %,

(b) removing said catalyst from the reaction product by washing with an acidic aqueous solution and then with water, and (c) removing residual cyclic ether compound from the washed and dried reaction product by evaporation.

11. The working fluid for a refrigerating cycle equipment of in accordance with claim 5, wherein a saturation solubility of said refrigerant in said refrigerator oil is 0.1 to 5 wt % at 70° C. and under a vapor pressure of said refrigerant of 1.77 MPa.

12. The working fluid for a refrigerating cycle equipment in accordance with claim 5, wherein a specific dielectric constant of the compound represented by the formula (2) is 40 to 100 at 25° C.

13. The working fluid for a refrigerating cycle equipment of in accordance with claim 5, wherein the compound represented by the formula (2) is at least one member selected from the group consisting of propylene carbonate, butylene carbonate and γ-butyrolactone, and further includes at least one member of polyalkylene glycol compounds represented by the general formula (8):

D is a hydrogen atom or wherein, z is a hydrogen atom or a monohydric alcohol residue, and t and u are an integer of 0 to 20 wherein, $t+u \geqq 2$ and 1 is an integer of 1 to 4.

14. The working fluid for a refrigerating cycle equipment of in accordance with claim 1, wherein content of the compound in said refrigeration lubricant is 50 to 100%.

15. The working fluid for a refrigerating cycle equipment of in accordance with claim 1, wherein dynamic viscosity of said refrigerator lubricant is $5 \times 10^{-6}$ to $4 \times 10^{-5}$ m²/s at 40° C.

* * * * *